US012723152B2

(12) United States Patent
Von Hagen et al.

(10) Patent No.: US 12,723,152 B2
(45) Date of Patent: Sep. 1, 2026

(54) COMPOSITION COMPRISING A COMB COPOLYMER

(71) Applicant: BYK-Chemie GmbH, Wesel (DE)

(72) Inventors: Robin Von Hagen, Düsseldorf (DE); Megumu Takai, Miki (JP); Andreas Okkel, Wesel (DE); Hiroshi Yonehara, Nishinomiya (JP); Benjamin Lindner, Rüdenhausen (DE); Yu Sugioka, Akashi (JP)

(73) Assignee: BYK-Chemie GmbH, Wesel (DE)

( * ) Notice: Subject to any disclaimer, the term of this patent is extended or adjusted under 35 U.S.C. 154(b) by 828 days.

(21) Appl. No.: 17/433,050

(22) PCT Filed: Feb. 21, 2020

(86) PCT No.: PCT/EP2020/054586
§ 371 (c)(1),
(2) Date: Aug. 23, 2021

(87) PCT Pub. No.: WO2020/173821
PCT Pub. Date: Sep. 3, 2020

(65) Prior Publication Data

US 2022/0041852 A1 Feb. 10, 2022

(30) Foreign Application Priority Data

Feb. 26, 2019 (EP) .................................... 19159412

(51) Int. Cl.

| | |
|---|---|
| ***C08L 39/06*** | (2006.01) |
| ***C08K 3/04*** | (2006.01) |
| ***C09K 23/16*** | (2022.01) |
| ***C09K 23/42*** | (2022.01) |
| ***H01M 4/62*** | (2006.01) |
| ***H01M 10/0525*** | (2010.01) |
| ***H01M 10/44*** | (2006.01) |

(52) U.S. Cl.
CPC .............. *C08L 39/06* (2013.01); *C08K 3/041* (2017.05); *C08K 3/042* (2017.05); *C08K 3/045* (2017.05); *C09K 23/16* (2022.01); *C09K 23/42* (2022.01); *H01M 4/625* (2013.01); *H01M 10/0525* (2013.01); *H01M 10/44* (2013.01); *C08K 2201/001* (2013.01)

(58) Field of Classification Search
CPC .......... C08L 39/06; C08L 33/04; C08K 3/041
See application file for complete search history.

(56) References Cited

U.S. PATENT DOCUMENTS

| | | | |
|---|---|---|---|
| 8,129,476 B2 | 3/2012 | Goebelt et al. | |
| 8,153,731 B2 | 4/2012 | Goebelt | |
| 8,540,902 B2 | 9/2013 | Xing | |
| 9,079,996 B2 | 7/2015 | Göbelt | |
| 9,087,626 B2 | 7/2015 | Xing | |
| 9,957,343 B2 | 5/2018 | Göbelt | |
| 10,583,403 B2 * | 3/2020 | Hikita | B01D 69/08 |
| 11,731,087 B2 * | 8/2023 | Ahn | C08K 3/06 210/500.41 |
| 2010/0099813 A1 | 4/2010 | Goebelt et al. | |
| 2011/0171371 A1 | 7/2011 | Li | |
| 2013/0004657 A1 | 1/2013 | Xu | |
| 2014/0332731 A1 | 11/2014 | Ma et al. | |

FOREIGN PATENT DOCUMENTS

| | | |
|---|---|---|
| CN | 106519249 | 3/2017 |
| DE | 102010049642 A1 | 1/2012 |
| EP | 2125910 B1 | 3/2011 |
| EP | 2296208 A1 | 3/2011 |
| JP | 2010097816 A | 4/2010 |
| JP | 2011070908 A | 4/2011 |
| JP | 2015227406 A | 12/2015 |
| JP | 2016025077 | 2/2016 |
| TW | 201347972 A | 12/2013 |

OTHER PUBLICATIONS

FIT translation of CN_106519249 (Year: 2024).*
Espacenet translation of CN106519249A_Description_20241031_1814 (Year: 2024).*
International Search Report and Written Opinion for International Application No. PCT/EP2020/054586 dated Apr. 3, 2020 (9 pages).
International Preliminary Report on Patentability International Application No. PCT/EP2020/054586 dated Dec. 21, 2020 (9 pages).

* cited by examiner

*Primary Examiner* — Michael M Dollinger
(74) *Attorney, Agent, or Firm* — Fitch, Even, Tabin & Flannery LLP

(57) ABSTRACT

The invention relates to a composition comprising a) a polymer a) comprising polymerized units of a N-vinyl lactam, b) a comb copolymer b) having a polymer backbone based on a vinyl aromatic compound and an ethylenically unsaturated polymerizable carboxylic anhydride, and having at least two polyalkylene oxide side chains, and c) a carbon-based material.

12 Claims, No Drawings

COMPOSITION COMPRISING A COMB COPOLYMER

The invention relates to a composition comprising a polymer comprising polymerized units of a N-vinyl lactam and a comb polymer. The invention further relates to the use of the composition as a dispersing agent for a carbon-based material, to a process of preparing a carbon-based material dispersion, and to a rechargeable electric battery.

EP 2296208 A relates to a composition for producing electrodes for a battery, in particular a lithium secondary battery. This document is concerned with stabilization of a dispersion of carbon-based material and improving battery performance. The inventors propose adding at least one of an organic dye derivative, an anthraquinone derivative having a basic functional group, and a triazine derivative as dispersing agent for a carbon-based material. Examples describe the use of polyvinyl pyrrolidone as an additive for preparing carbon black dispersions.

JP 2011070908 A relates to a liquid dispersion of an electrically conductive material for manufacture of a lithium ion battery. The dispersion contains an electrically conductive material, a dispersing agent, and a dispersion medium. The dispersing agent is a non-ionic polymer. Preferred polymers are polyvinyl alcohol, polyvinylpyrrolidone, cellulose resin, polyalkylene oxide, polyvinyl acetal, polyvinyl ether, chitin, chitosan, and starch. Examples of the dispersion medium include aprotic polar solvents, such as N-methyl-2-Pyrrolidone, dimethylsulfoxide, and dimethylformamide.

JP 2015227406 A describes a carbon black dispersion liquid and a lithium ion battery electrode material paste using the dispersion. Phthalocyanine metal complexes are proposed as dispersing agent for carbon black.

TW 201347972 A describes a drilling cover plate disposed on a metal substrate. The cover plate is glued to the metal using a resin composition including a comb copolymer based on a styrene-maleic anhydride copolymer and polyvinylpyrrolidone. The comb copolymer is typically prepared by grafting the styrene-maleic anhydride copolymer with the monomethyl ether of polyethylene glycol or polypropylene glycol.

There is an ongoing need for improved dispersing agents for carbon-based materials providing improved stabilization of carbon-based material dispersions and improved battery properties, for example improved charge-discharge cycle stability, when used in the manufacture of rechargeable batteries.

The invention provides a composition comprising a) a polymer a) comprising polymerized units of a N-vinyl lactam, b) a comb copolymer b) having a polymer backbone based on vinyl aromatic compound and ethylenically unsaturated polymerizable carboxylic anhydride, and having at least two polyalkylene oxide side chains, and c) a carbon-based material.

Polymer a) comprises polymerized units of a N-vinyl lactam. Polymerized units refer to N-vinyl lactams that have undergone polymerization of the ethylenically unsaturated vinyl group. Examples of suitable N-vinyl lactams may have 4-, 5-, 6-, or 7-membered rings, also referred to as beta, gamma, delta or epsilon lactams. Preferred examples include N-vinyl pyrrolidone and N-vinyl caprolactam.

In one embodiment, polymer a) is a copolymer of an N-vinyl lactam and other monomers having ethylenically unsaturated polymerizable groups. Examples of other monomers include esters of acrylic and methacrylic acid, vinyl aromatic compounds, and vinyl esters. In preferred embodiments, polymer a) consists of at least 50%, more preferably at least 80% by weight of polymerized units of N-vinyl lactams.

In one embodiment, polymer a) comprises polymerized units of one type of N-vinyl lactam. In other embodiments, polymer a) comprises polymerized units of two or more different types of N-vinyl lactams. It is preferred that polymer a) comprises or consists of polymerized units of N-vinylpyrrolidone.

The molecular weight of polymer a) is not particularly limited. In some embodiments, the weight average molecular weight of polymer a) is in the range of 2000 to 500000 g/mol, preferably in the range of 5000 to 100000 g/mol. It is particularly preferred that polymer a) has a weight average molecular weight in the range of 15000 to 80000 g/mol. Generally, polymer a) is an essentially linear polymer.

The weight average molecular weight of polymer a) can suitably be determined by gel permeation chromatography (GPC), using poly methyl methacrylate as calibration standard and N,N-dimethylacetamide as eluent.

Comb copolymer b) in the composition of the invention is a comb polymer having a polymer backbone based on vinyl aromatic compound and ethylenically unsaturated polymerizable carboxylic anhydride, and having at least two polyalkylene oxide side chains.

The polymer backbone of polymer b) generally is essentially linear, i.e. it is prepared by polymerization of ethylenically unsaturated polymerizable monomers having one ethylenically unsaturated polymerizable bond. If so desired, minor amounts of branching may be present in the polymer backbone of polymer b), for example by including monomers having more than one ethylenically unsaturated polymerizable bond.

The polymer backbone of comb polymer b) comprises polymerized units of a vinyl aromatic compound. Examples of suitable vinyl aromatic compounds include styrene, vinyl toluene, vinyl xylene, vinyl ethylbenzene, and mixtures thereof. The polymer backbone of comb polymer b) further comprises polymerized units of an ethylenically unsaturated polymerizable carboxylic anhydride, or of an ethylenically unsaturated polymerizable dicarboxylic acid. Examples of suitable monomers include maleic anhydride, itaconic anhydride, citraconic anhydride, fumaric acid, esters of the aforementioned compounds, and mixtures thereof. The polymer backbone of polymer b) can suitably be prepared by copolymerization of the above described two types of monomers. If so desired, other monomers may be included in the polymer backbone of polymer b), for example acrylic or methacrylic acid as well as esters thereof. In a preferred embodiment, the polymer backbone of comb polymer b) is a copolymer of styrene and maleic anhydride.

Polymer b) is a comb copolymer. A comb polymer is a copolymer having at least two polymeric side chains linked to the polymer backbone. Polymer b) has at least two polyalkylene oxide side chains linked to the polymer backbone. The comb copolymer b) generally has two to 100, preferably 2 to 50, more preferably 3 to 25, most preferably 4 to 12 polyalkylene oxide side chains. Generally, the polyalkylene oxide side chains are polyethers based on polymerized units of epoxides or oxetanes. Typically, the polyalkylene oxide side chains are based on polymerized units of ethylene oxide, propylene oxide, butylene oxide, and mixtures thereof. In the case of mixtures of alkylene oxides, these may be present in the polyalkylene oxide chain the form of two or more blocks or in random order. Polyalkylene oxide side chains based on ethylene oxide, propylene oxide, and in particular mixtures thereof, are preferred.

The weight average molecular weight of comb copolymer b) can suitably be determined by gel permeation chromatography (GPC), using polystyrene as calibration standard and THF as eluent.

The weight average molecular weight of the polyalkylene oxide side chains generally is in the range of 200 to 6000 g/mol, preferably 300 to 4000 g/mol. In some embodiments, the polyalkylene oxide side chains have ether end groups, for example alkyl ether end groups, such as ethyl or methyl ether end groups.

The polyalkylene oxide side chains can be linked to the polymer backbone by reaction of amine or alcohol terminated mono-functional polyoxyalkylene oxides with carboxylic anhydride groups of the polymer backbone. Reaction of a primary amine group with a carboxylic anhydride group can result in an amide link or in an imide link. It is preferred that the polyoxyalkylene oxide side chains of comb copolymer b) are linked to the polymer backbone via an amide group or an imide group, for example by reaction of a copolymer of styrene and maleic anhydride with a polyether monoamine. Suitable polyether amines are available under the trade designation Jeffamine® M from Huntsman. Alternatively, the polyalkylene oxide side chains may be linked to the polymer backbone via an ester link. This can be achieved by reacting carboxylic anhydride groups of the polymer backbone with hydroxyl terminated polyalkylene oxide mono-ethers.

In preferred embodiments comb copolymer b) comprises further functional groups comprising at least one of hydroxyl, carboxylic acid, salt of carboxylic acid, tertiary amine, salt of tertiary amine, and quaternary ammonium.

Hydroxyl groups may be included by reacting carboxylic anhydride groups of the polymer backbone with alkanolamines, such as ethanol amine.

Carboxylic acid groups may be included by ring opening reactions of carboxylic anhydride groups of the polymer backbone with alcohols or amines. The carboxylic acid groups may be neutralized by a base to form salts of carboxylic acids.

Comb copolymer b) suitably has an acid value in the range of 0 to 300 mg KOH/g. In preferred embodiments, the acid value of comb copolymer b) is in the range of 0 to 150 mg KOH/g, more preferred 0 to 100 mg KOH/g, or 0 to 70 mg KOH/g.

Tertiary amine groups may be introduced by reacting carboxylic anhydride groups of the polymer backbone with diamines having a tertiary amine group and a primary or secondary amine group, such as 3-dimethyl amino propylamine. The tertiary amines may be neutralized with an acid to form a salt thereof. Alternatively, the tertiary amines may be quaternized with a quaternization agent to form a quaternary ammonium group. Examples of suitable quaternization agents include alkyl halides or benzyl halides, as well as epoxides in combination with carboxylic acids. Comb copolymer b) comprising at least one of tertiary amine, salt of tertiary amine, and quaternary ammonium are preferred.

Comb copolymer b) suitably has an amine value in the range of 0 to 300 mg KOH/g. In preferred embodiments, the amine value of comb copolymer b) is in the range of 0 to 150 mg KOH/g, more preferred 0 to 100 mg KOH/g, or 0 to 70 mg KOH/g.

The weight average molecular weight of comb copolymer b) suitably is in the range of 4000 to 100000 g/mol, preferably in the range of 6000 to 60000 g/mol. The weight average molecular weight can be determined as described above for comb copolymer b).

Examples of suitable comb polymers b) and the preparation thereof are described in detail in European patent application EP 2125910 A.

In the composition of the invention the weight ratio of polymer a) to comb copolymer b) preferably is in the range of 10:90 to 90:10, more preferably in the range of 25:75 to 75:25.

In preferred embodiments, the composition of the invention is provided as a liquid composition. Therefore, the composition preferably comprises at least one solvent. Generally, the solvent is an organic solvent. The choice of solvent is not particularly critical. Suitable solvents are capable of dissolving polymer a) and comb copolymer b). It is also possible, to use a combination of solvents. Due to the relatively polar properties of polymer a), it is generally preferred that the solvent comprises an aprotic dipolar solvent, such as dimethyl sulfoxide, dimethyl formamide or N-methyl pyrrolidone.

Although the water content of the composition is not particularly critical, it has been found that a high water content, caused by high water absorbability of polymer a), can in some embodiments decrease the storage stability and homogeneity of the composition. Therefore, it is preferred that the water content of the composition is in the range of 0.0 to 5.0% by weight, calculated on the total weight of the composition. It is particularly preferred, that the water content of the composition is in the range of 0.0 to 3.0% by weight, and even more preferably in the range of 0.0 to 1.5% by weight.

The water content can suitably be determined by Karl-Fischer titration.

A composition comprising polymer a) and polymer b) is highly suitable as dispersing agent for a carbon-based material. Therefore, the composition of the invention comprises a carbon-based material. A carbon-based material is a material which consists for 90 to 100% by weight of carbon. For use in the field of electrode manufacture for batteries, a carbon-based material is selected which is electrically conductive. Examples of suitable electrically conductive carbon-based materials include carbon black, carbon nano tubes, graphite, carbon fibers, graphene, fullerenes, and mixtures thereof. Preferred carbon-based materials are carbon black, graphene, and carbon nano tubes. Specific types of suitable carbon black are furnace black and acetylene black.

The invention further relates to a process of preparing a carbon-based material dispersion comprising the steps of

- i) Providing a composition comprising a polymer a) comprising polymerized units of a N-vinyl lactam and a comb polymer b) having a polymer backbone based on a vinyl aromatic compound and an ethylenically unsaturated polymerizable carboxylic anhydride, and having at least two polyalkylene oxide side chains,
- ii) Providing a carbon-based material,
- iii) Mixing the components provided in steps i) and ii) and exerting shear force to prepare a carbon-based material dispersion.

Shear force can be provided by well-known equipment for dispersing pigments, for example by ball mills or by high-speed stirrers. Suitably, between 1 and 40% by weight of polymer a) and polymer b) together are employed in the process, calculated on the weight of carbon-based material.

Dispersions of carbon-based materials wherein the composition of the invention is used as dispersant exhibit favorable properties, such as low viscosity and small particle size of the carbon-based material.

The composition of the invention comprising a carbon-based material can be used with great advantage for preparing an electrode paste for a rechargeable battery. Therefore, the invention also relates to a rechargeable electrical battery having an electrode comprising the composition of the invention. The expression battery encompasses a single electrochemical cell that contains electrodes, a separator, and an electrolyte, as well as a collection of cells or cell assemblies.

A rechargeable battery can be produced, using an electrode as a constituent element, preferably as a cathode. The term cathode designates the electrode where reduction is taking place during the discharge cycle.

The paste for an electrode contains a dispersion of a carbon-based material, an active electrode material, and a binder. The paste for an electrode can be obtained by kneading. A known device such as a ribbon mixer, a screw-type kneader, a Spartan Granulator, a Loedige Mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 50 parts by mass in terms of 100 parts by mass of the non-volatile material of the paste, and in particular, the use amount is preferably about 1.5 to 20 parts by mass.

A solvent can be used at a time of kneading. Examples of the solvent include known solvents such as: dimethylformamide and isopropanol; toluene and N-methylpyrrolidone in the case of a fluorine-based polymer; water in the case of SBR. In the case of the binder using water as a solvent, it is preferred to use a thickener together. The amount of the solvent is adjusted so as to obtain a viscosity at which a paste can be applied to a collector easily.

An electrode may be formed of a molding of the above-mentioned paste for an electrode. The electrode is obtained, for example, by applying the paste for an electrode to a collector, followed by drying and pressure molding.

Examples of the collector include foils and mesh of aluminum, nickel, copper, stainless steel and the like. The coating thickness of the paste is generally 40 to 200 μm. There is no particular limitation to the paste coating method, and an example of the coating method includes a method involving coating with a doctor blade or a bar coater, followed by molding with roll pressing or the like.

Examples of the pressure molding include roll pressure molding, compression molding, and the like. The pressure for the pressure molding is preferably about 1 to 3 $t/cm^2$. As the density of the electrode increases, the battery capacity per volume generally increases. However, if the electrode density is increased too much, the cycle characteristic is generally degraded. If the paste for an electrode in a preferred embodiment of the present invention is used, the degradation in the cycle characteristic is small even when the electrode density is increased. Generally, the electrode density is in the range of 1.0 to 4.0 $g/cm^3$. In some embodiments, the electrode density of a cathode is in the range of 2.0 to 3.5 $g/cm^3$, and the density of an anode is in the range of 1.2 to 2.0 $g/cm^3$.

The rechargeable battery in a preferred embodiment of the present invention is described by taking a lithium ion rechargeable battery as a specific example. The lithium ion rechargeable battery has a structure in which an anode and a cathode are soaked in an electrolyte.

In the cathode of the lithium ion rechargeable battery, a transition metal oxide containing lithium, or a lithium metal phosphate, such as $LiFePO_4$, is generally used as a cathode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co, and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned active materials, it is preferred that at least one kind of material having a spinel structure represented by a general formula $Li_xMO_2$(M represents at least one kind of Co, Ni, Fe, and Mn, and x is 0 to 1.2), or $Li_yN_2O_4$(N contains at least Mn, and y is 0 to 2) be used.

Further, as the cathode active material, there may be particularly preferably used at least one kind of materials each including $Li_yM_aD_{1-a}O_2$(M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) and materials each having a spinel structure represented by $Li_z(N_bE_{1-b})_2O_4$(N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$(x=0.02 to 1.2, a=0.1 to 0.9, b=0.9 to 0.98, and z=2.01 to 2.3). It should be noted that the value of x may increase and decrease in accordance with charge and discharge.

Although the average particle size of the cathode active material is not particularly limited, the size is preferably 0.1 to 50 μm. It is preferred that the volume of the particles of 0.5 to 30 μm be 95% or more. It is more preferred that the volume occupied by the particle group with a particle diameter of 3 μm or less be 18% or less of the total volume, and the volume occupied by the particle group of 15 μm or more and 25 μm or less be 18% or less of the total volume.

Although the specific area is not particularly limited, the area is preferably 0.01 to 50 $m^2/g$, particularly preferably 0.2 $m^2/g$ to 1 $m^2/g$ by a BET method.

In a lithium ion rechargeable battery, a separator may be provided between a cathode and anode. Examples of the separator include non-woven fabric, cloth, and a microporous film each mainly containing polyolefin such as polyethylene and polypropylene, a combination thereof, and the like.

As an electrolyte forming the lithium ion rechargeable battery in a preferred embodiment of the present invention, a known organic electrolyte, inorganic solid electrolyte, and polymer solid electrolyte may be used, but an organic electrolyte is preferred in terms of ionic conductivity.

As a solvent of the organic electrolyte (non-aqueous solvent), preferred is a solution of an organic solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, or 1,3-dioxolan; a carbonate such as ethylene carbonate or propylene carbonate; γ-butyrolactone; N-methylpyrrolidone; acetonitrile; nitromethane, 1,2-dimethoxyethane; or the like. Further, there are preferably exemplified: carbonates such as ethylene carbonate, butylene carbonate, diethyl carbonate, dimethyl carbonate, methyl ethyl carbonate, propylene carbonate, vinylene carbonate, and esters such as γ-butyrolactone; ethers such as dioxolan, diethyl ether, and diethoxyethane; dimethylsulfoxide; acetonitrile; tetrahydrofuran; and the like. A carbonate-based non-aqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and the like.

Examples of the polymer solid electrolyte include a polyethylene oxide derivative, a polypropylene oxide derivative, a phosphoric acid ester polymer, a polycarbonate derivative, and the like.

EXAMPLES

Raw Materials:

- Potassium carbonate: (Sigma-Aldrich)
- (Dowanol) PMA: 1-methoxy-2-propyl acetate (DOW Chemicals)
- SMA 2000: Styrene-maleic anhydride copolymer (molar ratio of styrene/maleic anhydride=2/1) (Cray Valley)
- Jeffamine M 2070: Amine-terminated EO/PO polyether (Huntsman)
- Lutensol AO11: Fatty alcohol (number of carbon: 13-15) ethoxylate (repeating unit of polyethylene glycol=11) (BASF)
- DMAPA: N,N-Dimethylaminopropylamine (Huntsman)
- Grilonit RV 1814: Alkyl (number of carbon: 13-15) glycidyl ether (EMS-GRILTECH)
- Benzoic acid: (Sigma-Aldrich)
- AMP: 95% of Aminomethyl propanol and 5% of water, (Sigma-Aldrich)
- NMP: N-Methylpyrrolidone (BASF)
- DISPERBYK-111: Acidic polymer, acid value=129 mg KOH/g (BYK-Chemie)

Measurement of Non-Volatile Content (Solids Content)

The sample (2.0±0.2 g of the tested substance) was weighed accurately into a previously dried aluminum dish and dried for 20 minutes at 150° C. in the varnish drying cabinet, cooled in a desiccator and then reweighed. The residue corresponds to the solids content in the sample (ISO 3251).

Measurement of the Amine Value 1.5 to 3.0 g of a dispersant was precisely weighed out into a 80 mL beaker and dissolved with 50 mL of acetic acid. Using an automatic titration device provided with a pH electrode, this solution was neutralization-titrated with a 0.1 mol/L $HClO_4$ acetic acid solution. A flexion point of a titration pH curve was used as a titration endpoint, and an amine value was obtained by the following equation (DIN 16945).

$$\text{Amine value[mg KOH/g]}=(561\times0.1\times f\times V)/(W\times S)$$

(wherein f: factor of titration agent, V: titration amount at titration endpoint [mL], W: weighed amount of dispersant sample [g], S: solid matter concentration of dispersant sample [wt %])

Measurement of the Acid Value 1.5 to 3.0 g of a dispersant was precisely weighed out into a 80 mL beaker and dissolved with 50 mL of ethanol. Using an automatic titration device provided with a pH electrode, this solution was neutralization-titrated with a 0.1 mol/L ethanolic KOH solution. A flexion point of a titration pH curve was used as a titration endpoint, and an amine value was obtained by the following equation (DIN EN ISO 2114).

$$\text{Acid value[mg KOH/g]}=(561\times0.1\times f\times V)/(W\times S)$$

(wherein f: factor of titration agent, V: titration amount at titration endpoint [mL], W: weighed amount of dispersant sample [g], S: solid matter concentration of dispersant sample [wt %])

Gel Permeation Chromatography (GPC)

Weight-average molecular weight Mw was determined according to DIN 55672-1:2007-08 at 40° C. using a high-pressure liquid chromatography pump (WATERS 600 HPLC pump) and a refractive index detector (Waters 410). As separating columns, a combination was used of 3 Styragel columns from WATERS with a size of 300 mm×7.8 mm ID/column, a particle size of 5 μm, and pore sizes HR4, HR2 and HR1. The eluent used was tetrahydrofuran with 1% by volume of dibutylamine, with an elution rate of 1 ml/min. The conventional calibration was carried out using polystyrene standards.

Synthesis of Comb Copolymer C-1

85 g PMA was added into a reactor. 21 g SMA 2000 was added during stirring, while the mixture was heated up to 70° C. Then, 64 g of Jeffamine M 2070 and 4 g of DMAPA were added dropwise to the reactor. The reaction was carried at 170° C. for 4 hours. PMA was distilled off during the reaction. Mw of the polymer was 30210 g/mol.

In a next step, the reactor was cooled down to 120° C. Then, 9 g of Grilonit RV 1814 and 4 g of benzoic acid were added to the reactor. The reaction was carried out at 120° C. for 4 hours. After that, a comb copolymer C-1 was obtained.

The comb copolymer C-1 has a 100% solid content, an amine value of 18 mg KOH/g and an acid value of 8 mg KOH/g.

Synthesis of Comb Copolymer C-2

85 g PMA was added into a reactor. 21 g SMA 2000 was added during stirring, while the mixture was heated up to 70° C. Then, 79 g of Jeffamine M 2070 was added dropwise to the reactor. The reaction was carried at 170° C. for 4 hours. After solvent-removal at reduced pressure, a comb copolymer C-2 was obtained.

The comb copolymer C-2 has a 100% solid content and an acid value of 27 mg-KOH/g. Mw of the comb copolymer C-2 was 31220 g/mol.

Synthesis of Comb Copolymer C-3

85 g PMA is added into a reactor. 21 g SMA 2000 was added during stirring, while the mixture was heated up to 70° C. After addition of 0.4 g potassium carbonate, 43 g Lutensol AO11 was added dropwise and the reactor was heated up to 140° C. for 4 hours.

In a next step, PMA was distilled off at 150° C. at reduced pressure. After cooling down to 80° C., 30 g NMP was added to the reactor. After adding 6 g AMP, followed by homogenization, comb copolymer C-3 was obtained.

The comb copolymer C-3 has a 70% theoretical solid content (solvent: NMP), an amine value of 37 mg KOH/g and an acid value of 27 mg KOH/g. Mw of the comb copolymer C-3 was 9600 g/mol.

Synthesis of Comb Copolymer C-4

50 g PMA was added into a reactor. 13 g SMA 2000 was added during stirring, while the mixture was heated up to 70° C. Then, 24 g of Jeffamin M 2070 was added dropwise to the reactor and the reaction was carried at 170° C. for 4 hours. PMA was distilled off during the reaction. Mw of the comb copolymer was 23590 g/mol.

In a next step, 50 g NMP was added to the reactor, followed by, 11 g of DISPERBYK-111. The salinization reaction is carried out at 80° C. for 1 hour to obtain the comb copolymer C-4.

The comb copolymer C-4 has a 50% solid content (solvent: NMP), an amine value of 15 mg KOH/g and an acid value of 18 mg KOH/g.

Production of Carbon Black Dispersion

Carbon black: Denka Black (granular) (Denka)

PVP K30: Polyvinyl pyrrolidone Sokalan K30P (BASF), Mw 40.000 g/mol

The dispersions were prepared using a paint shaker Disperser DAS 200 (LAU GmbH) and 150 g of 2 mm Zirconia beads. Dispersing time was 3 hours at 30° C.

General Procedure for Preparing the Carbon Black Dispersions D-1 to D-8

A comb copolymer (C-1, C-3 and C-4) and PVP K30 stored in a sealed box were dissolved in NMP in a 140 ml glass bottle. Then, carbon black was added and the mixture was dispersed for 3 hours at 30° C. to obtain the respective carbon black dispersion D-1 to D-8 (Details are described in Table 1).

General Procedure for Preparing Comparative Carbon Black Dispersions CD-1 to CD-3

Carbon black dispersions CD-1 to CD-3 were prepared using the same procedure as used for carbon black dispersions D-1 to D-8, except that they did not contain PVP K30. (Details are described in Table 1).

Procedure for Preparing Comparative Carbon Black Dispersion CD-4

Carbon black dispersion CD-4 was prepared using the same procedure as used for carbon black dispersions D-1 to D-8, except that it did not contain the comb copolymer. (Details are described in Table 1).

TABLE 1

Recipes of carbon black dispersions D-1 to D-8, and CD-1 to CD-4

| Name of carbon black dispersion | Carbon black (g) | Dispersant: Comb copolymer Product name | Dispersant: Comb copolymer Amount (g) | Dispersant: PVP K30 (g) | Weight ratios between comb copolymer and PVP K30 | Solvent NMP (g) |
|---|---|---|---|---|---|---|
| D-1 | 10.00 | C-1 | 0.75 | 0.25 | 75/25 | 39.00 |
| D-2 | 10.00 | C-1 | 0.50 | 0.50 | 50/50 | 39.00 |
| D-3 | 10.00 | C-1 | 0.25 | 0.75 | 25/75 | 39.00 |
| D-4 | 10.00 | C-3 | 1.07 | 0.25 | 75/25 | 38.68 |
| D-5 | 10.00 | C-3 | 0.71 | 0.50 | 50/50 | 38.79 |
| D-6 | 10.00 | C-3 | 0.36 | 0.75 | 25/75 | 38.89 |
| D-7 | 10.00 | C-4 | 1.00 | 0.50 | 50/50 | 38.50 |
| D-8 | 10.00 | C-4 | 0.50 | 0.75 | 25/75 | 38.75 |
| CD-1 | 10.00 | C-1 | 1.00 | | 100/0 | 39.00 |
| CD-2 | 10.00 | C-3 | 1.43 | | 100/0 | 38.57 |
| CD-3 | 10.00 | C-4 | 2.00 | | 100/0 | 38.00 |
| CD-4 | 10.00 | | | 1.00 | 0/100 | 39.00 |

Preparation of Carbon Nano Tube (CNT) Dispersion

CNT: FT7320 (C-nano)

The dispersions were prepared using a Paint shaker Disperser DAS 200 (LAU GmbH) and 50 g of 1 mm glass beads. Dispersing time was 12 hours at 30° C.

General Procedure for Preparing CNT Dispersions D-9 to D-11

A comb copolymer C-1 to C-3 and PVP K30 stored in sealed box were dissolved in NMP in a 100 ml glass bottle. Then, CNT was added and the mixture was dispersed for 12 hours at 30° C. to obtain the respective CNT dispersion D-9 to D-11 (Details are described in Table 2).

General Procedure for Preparing Comparative CNT Dispersions CD-5 to CD-7

CNT dispersions CD-5 to CD-7 were prepared using the same procedure as used for CNT dispersions D-9 to D-11, except that they did not contain PVP K30. (Details are described in Table 2).

General Procedure for Preparing CNT Dispersion CD-8

CNT dispersion CD-8 was prepared using the same procedure as used for CNT dispersions D-9 to D-11, except that it did not contain the comb copolymer. (Details are described in Table 2).

TABLE 2

Recipes of CNT dispersions

| Name of CNT dispersion | CNT (g) | Dispersant: Comb copolymer Product name | Dispersant: Comb copolymer Amount (g) | Dispersant: PVP K30 (g) | Weight ratios between comb copolymer and PVP K30 | Solvent NMP (g) |
|---|---|---|---|---|---|---|
| D-9 | 0.50 | C-1 | 0.13 | 0.13 | 50/50 | 49.24 |
| D-10 | 0.50 | C-3 | 0.18 | 0.13 | 50/50 | 49.19 |
| D-11 | 0.50 | C-2 | 0.13 | 0.13 | 50/50 | 49.24 |
| CD-5 | 0.50 | C-1 | 0.25 | | 100/0 | 49.25 |
| CD-6 | 0.50 | C-3 | 0.36 | | 100/0 | 49.14 |
| CD-7 | 0.50 | C-2 | 0.25 | | 100/0 | 49.25 |
| CD-8 | 0.50 | | | 0.25 | 0/100 | 49.25 |

Application Test Results

Viscosity of Carbon Black Dispersion and CNT Dispersion

Viscosity of carbon black dispersion was measured by using BROOKFIELD VISCOMETER DV-II+ (BROOKFIELD, upper limitation of viscosity: 1000 mPa·s).

Particle Size of Carbon Black Dispersion

Particle size (median diameter: D50) of carbon black dispersion was measured by using Particle Size Analyzer ELSZ-1000 (Otsuka Electronics).

Example 1-6 Viscosity and Particle Size of Carbon Black Dispersion D-2, D-3, and D-5 to D-8

Viscosity (at 20° C., rotation: 60 rpm) and particle size (D50) of carbon black dispersions D-2, D-3 and D-5 to D-8 are described in Table 3.

TABLE 3

| Viscosity and particle size of carbon black dispersion | | | |
|---|---|---|---|
| Example | Name of carbon black dispersion | Viscosity (mPa · s) (at 20° C., 60 rpm) | Particle size (D50, nm) |
| 1 | D-2 | 24 | 199 |
| 2 | D-3 | 28 | 155 |
| 3 | D-5 | 28 | 183 |
| 4 | D-6 | 17 | 149 |
| 5 | D-7 | 62 | 176 |
| 6 | D-8 | 24 | 145 |

Comparison Example 1-4: Viscosity and Particle Size of Carbon Black Dispersion CD-1-CD-4

Viscosity (at 20° C., rotation: 60 rpm) and particle size (D50) of carbon black dispersions CD-1-CD-4 are described in Table 4.

TABLE 4

| Viscosity and particle size of carbon black dispersion CD-1-CD-4 | | | |
|---|---|---|---|
| Comparison example | Name of carbon black dispersion | Viscosity (mPa · s) (at 20° C., 60 rpm) | Particle size (D50, nm) |
| 1 | CD-1 | Not measured* | >1000 |
| 2 | CD-2 | Not measured* | >1000 |
| 3 | CD-3 | Not measured* | >1000 |
| 4 | CD-4 | 65 | 162 |

*Viscosity is more than 1000 mPa · s

According to the results in Table 3 and 4, the carbon black dispersions including the mixture of comb copolymer and PVP (Example 1-6) showed lower viscosity and smaller particle size (D50) compared with those of the carbon black dispersions including comb copolymer only or PVP only (Comparison example 1-4).

Example 7-9: Viscosity of CNT Dispersion D-9-D-11

Viscosity (at 20° C., rotation: 1 rpm and 100 rpm) is described in Table 5.

TABLE 5

| Viscosity of CNT dispersion D-9-D-11 | | | |
|---|---|---|---|
| Example | Name of CNT dispersion | Viscosity (mPa · s) (at 20° C., 1 rpm) | Viscosity (mPa · s) (at 20° C., 100 rpm) |
| 7 | D-9 | 52 | 25 |
| 8 | D-10 | 42 | 20 |
| 9 | D-11 | 35 | 20 |

Comparison Example 5-8: Viscosity of CNT Dispersion CD-5-CD-8

Viscosity (at 20° C., rotation: 1 rpm and 100 rpm) is described in Table 6.

TABLE 6

| Viscosity of CNT dispersion CD-5-CD-8 | | | |
|---|---|---|---|
| Comparison example | Name of CNT dispersion | Viscosity (mPa · s) (at 20° C., 1 rpm) | Viscosity (mPa · s) (at 20° C., 100 rpm) |
| 5 | CD-5 | Not measured* | Not measured* |
| 6 | CD-6 | Not measured* | Not measured* |
| 7 | CD-7 | Not measured* | Not measured* |
| 8 | CD-8 | 60 | 26 |

*Viscosity is more than 1000 mPa · s

According to the results in Table 5 and 6, the CNT dispersions including the mixture of comb copolymer and PVP (Example 7-9) showed lower viscosity at different shear rates compared with that of the CNT dispersions including comb copolymer only or PVP only (Comparison example 5-8).

Evaluation of Volume Resistivity

Volume Resistivity

The electrode material $Li_{1+x}(Ni_{0.5}Co_{0.2}Mn_{0.3})_{1-x}O_2$ (NCM), polyvinylidene difluoride (PVDF) as a binding agent, and a carbon black (CB) dispersion as a conductive auxiliary agent were added to N-methyl-2-pyrrolidone. The mass ratio, based on non volatile material, in a paste of electrode material was NCM:CB:PVDF=93:5:2, and the components were mixed together, thereby preparing the paste of an electrode material.

The paste of an electrode material was applied to a surface of 180 μm-thick PET sheet so as to form a coating, and the coating was dried, thereby forming a cathode layer on the surface of the PET sheet. After that, this PET sheet with cathode layer was cut to 3 cm width to measure the volume resistivity of the cathode layer.

In addition, the volume resistivity of the electrode coating was measured by means of a four point measurement using a low resistivity meter (Mitsubishi Chemical Corporation product, model No.: Loresta-AX) at 25° C.

Examples 10-12: Volume Resistivity of Electrode Coatings Prepared with the Carbon Black Dispersions D-4-D-6

Volume resistivity of the electrode coatings prepared with carbon black dispersion D-4-D-6 is described in Table 7.

TABLE 7

| Volume resistivity of the carbon black dispersion D-4-D-6 | | |
|---|---|---|
| Example | Name of carbon black dispersion | Volume resistivity (Ω · cm) |
| 10 | D-4 | 29 |
| 11 | D-5 | 28 |
| 12 | D-6 | 35 |

Comparison Example 9: Volume Resistivity of the Electrode Coating Prepared with the Carbon Black Dispersion CD-4

Volume resistivity of the electrode coating prepared with the carbon black dispersion CD-4 is described in Table 8.

TABLE 8

| Volume resistivity of the electrode coating prepared with the carbon black dispersion CD-4 | | |
|---|---|---|
| Comparison example | Name of carbon black dispersion | Volume resistivity (Ω · cm) |
| 9 | CD-4 | 37 |

According to the results in Table 7 and 8, the electrode coatings prepared with the carbon black dispersions including the mixture of comb copolymer and PVP (Example 10-12) showed lower volume resistivity compared with that of the carbon black dispersion including PVP only (Comparison example 9).

Battery Assembly 90 wt % of $Li_{1+x}(Ni_{0.5}Co_{0.2}Mn_{0.3})_{1-x}O_2$(NCM), as cathode active material, 5.5 wt % of carbon black (CB) which was supplied as dispersion, and 4.5 wt % of PVDF were combined and mixed in a mixer Dispermat CV (VMA Getzmann GmbH) to prepare a cathode mixture. Subsequently, the cathode mixture was coated, dried, and rolled over aluminum foil having 21 μm-thickness. The cathode mixture was applied in an amount of 15.4 mg/cm$^2$.

96 wt % of graphite, as a electrode active material, 2.0 wt % of carboxymethyl cellulose (CMC), and 2.0 wt % of styrene-butadiene-rubber (SBR) were combined and mixed in a mixer to prepare an anode mixture. Subsequently, the anode mixture was coated and dried and rolled over copper foil having a 17 μm-thickness. The anode mixture was applied in an amount of 8.4 mg/cm$^2$.

As the separator, a microporous film made of polypropylene with a thickness of 16 μm was used. The battery structure had the following configuration: cathode/separator/anode. It was assembled in the form of a laminated cell which was impregnated with a carbonate electrolytic solution which contained 1 mol of $LiPF_6$ dissolved therein and in which a volumetric ratio of ethylene carbonate (EC): propylene carbonate (PC) was 1:1 as an electrolyte to manufacture a battery.

C-Rate Discharge Performance

For a battery with a maximum capacity Q, of 22 mAh, a "1 C current would be 22 mA, where the unit C or C-rate is a capacity expressed current in units of 1/h to be multiplied by Q, to get the current in amps.

C-rate discharge was increased from 0.2 C to 2 C. Then, C-rate discharge capacity was measured as the discharge capacity from 4.3 V to 3.0 V.

In all these tests, charging was done under constant current of 0.067 C to a voltage limit of 4.3 V and constant voltage to a current limit of 0.03 C while the discharging rate was progressively increased. C-rate performance tests were done at a temperature condition of 25° C.

Example 13-15: C-Rate Discharge Performance of Battery Including the Carbon Black Dispersion D-4-D-6

C-rate discharge performance of battery including the carbon black dispersion D-4-D-6 is described in Table 9.

TABLE 9

| C-rate discharge performance of battery including the carbon black dispersion D-4-D-6 | | | | |
|---|---|---|---|---|
| | Name of carbon | C-rate discharge performance Capacity (%) | | |
| Example | black dispersion | 0.5 of C-rate | 1.0 of C-rate | 2.0 of C-rate |
| 13 | D-4 | 100 | 95 | 84 |
| 14 | D-5 | 100 | 95 | 85 |
| 15 | D-6 | 100 | 93 | 77 |

Comparison Example 10: C-Rate Discharge Performance of Battery Including the Carbon Black Dispersion CD-4

C-rate discharge performance of battery including the carbon black dispersion CD-4 is described in Table 10.

TABLE 10

| C-rate discharge performance of battery including the carbon black dispersion CD-4 | | | | |
|---|---|---|---|---|
| Comparison | Name of carbon | C-rate discharge performance Capacity (%) | | |
| example | black dispersion | 0.5 of C-rate | 1.0 of C-rate | 2.0 of C-rate |
| 10 | CD-4 | 100 | 92 | 76 |

According to the results in Table 9 and 10, the battery including the carbon black dispersions which contain the mixture of comb copolymer and PVP (Example 13-15) showed better C-rate discharge performance compared to the battery including the carbon black dispersion which contains PVP only (Comparison example 10).

Cycle Test

For cycle life evaluation of the cell, the cell was repeatedly charged and discharged 0, 50, 100, 200, 400 and 500 times under a temperature condition of 25° C., Charging was done under constant current of 0.067 C to a voltage limit of 4.3 V and constant voltage to a current limit of 0.03 C. Discharge was done under a constant current of 1 C to a voltage limit of 3.0 V.

The discharge capacity of the 1$^{st}$ cycle was set as 100%.

Example 16-17: Cycle Test of Battery Including the Carbon Black Dispersion D-5-D-6

Cycle test of battery including the carbon black dispersion D-5-D-6 is described in Table 11.

TABLE 11

Cycle test of battery including of the carbon black dispersion D-5-D-6

| Example | Name of carbon black dispersion | Cycle test Cycle (times) 0 | 50 | 100 | 200 | 400 | 500 |
|---|---|---|---|---|---|---|---|
| 16 | D-5 | 100 | 98.3 | 95.1 | 89.8 | 81.1 | 76.4 |
| 17 | D-6 | 100 | 97.5 | 94.5 | 89.9 | 82.8 | 79.2 |

Comparison Example 11 Cycle Test of Battery Including the Carbon Black Dispersion CD-4

Cycle test of battery including the carbon black dispersion CD-4 is described in Table 12.

TABLE 12

Cycle test of battery including of the carbon black dispersion CD-4

| Comparison example | Name of carbon black dispersion | Cycle test Cycle (times) 0 | 50 | 100 | 200 | 400 | 500 |
|---|---|---|---|---|---|---|---|
| 11 | CD-4 | 100 | 96.3 | 91.9 | 85.2 | 71.3 | 64.4 |

According to the results in Table 11 and 12, it is evident that the battery including the carbon black dispersions which contain the mixture of comb copolymer and PVP (Example 16-17) showed better cycle test performance compared to the battery including the carbon black dispersion which contains PVP only (Comparison example 11).

The invention claimed is:

1. A composition comprising a) a polymer a) comprising polymerized units of N-vinylpyrrolidone, b) a comb copolymer b) having a polymer backbone based on a vinyl aromatic compound comprising one or more of styrene, vinyl toluene, vinyl xylene, or vinyl ethylbenzene and an ethylenically unsaturated polymerizable carboxylic anhydride or acid comprising one or more of maleic anhydride, itaconic anhydride, citraconic anhydride, or fumaric acid, or esters of the foregoing anhydrides, and having at least two polyalkylene oxide side chains, c) an electrically conductive carbon-based material comprising at least one of carbon black, carbon nano tubes, graphite, carbon fibers, graphene, and fullerenes, and d) at least one organic solvent comprising N-methyl pyrrolidone, wherein the weight ratio of polymer a) to copolymer b) is in a range of 25:75 to 75:25.

2. The composition according to claim 1, wherein the weight average molecular weight of polymer a) is in the range of 2,000 to 500,000 g/mol.

3. The composition according to claim 1, wherein the polyalkylene oxide side chains of comb polymer b) are linked to the polymer backbone via an amide group or an imide group.

4. The composition according to claim 1, wherein the comb copolymer b) comprises further functional groups comprising at least one of hydroxyl, carboxylic acid, salt of carboxylic acid, tertiary amine, salt of tertiary amine, and quaternary ammonium.

5. The composition according to claim 1, wherein the weight average molecular weight of comb polymer b) is in the range of 4,000 to 100,000 g/mol.

6. The composition according to claim 1, wherein the water content of the composition is in the range of 0.0 to 5.0% by weight, calculated on the total weight of the composition.

7. The composition according to claim 1, wherein the carbon-based material comprises at least one of carbon black and carbon nano tubes.

8. A process of preparing a carbon-based material dispersion comprising the steps of i) providing a composition comprising a) a polymer a) comprising polymerized units of a N-vinylpyrrolidone, and b) a comb copolymer b) having a polymer backbone based on a vinyl aromatic compound comprising one or more of styrene, vinyl toluene, vinyl xylene, or vinyl ethylbenzene and an ethylenically unsaturated polymerizable carboxylic anhydride or acid comprising one or more of maleic anhydride, itaconic anhydride, citraconic anhydride, or fumaric acid, or esters of the foregoing anhydrides, and having at least two polyalkylene oxide side chains; wherein the weight ratio of polymer a) to copolymer b) is in a range of 25:75 to 75:25 ii) providing an electrically conductive carbon-based material comprising at least one of carbon black, carbon nano tubes, graphite, carbon fibers, graphene, and fullerenes, iii) mixing the components provided in steps i) and ii) with at least one organic solvent comprising N-methyl pyrrolidone and exerting shear force to prepare a carbon-based material dispersion.

9. A rechargeable electrical battery having an electrode comprising the composition according to claim 1.

10. The rechargeable electrical battery according to claim 9, wherein the comb copolymer b) comprises further functional groups comprising at least one of hydroxyl, carboxylic acid, salt of carboxylic acid, tertiary amine, salt of tertiary amine, and quaternary ammonium.

11. The composition according to claim 1, wherein polymer a) comprises polymerized units of N-vinylpyrrolidone, and wherein the comb copolymer b) comprises further functional groups comprising at least one of hydroxyl, carboxylic acid, salt of carboxylic acid, tertiary amine, salt of tertiary amine, and quaternary ammonium.

12. The composition according to claim 1, wherein the combined amount of polymer a) and comb copolymer b) is 1 to 40% of the weight of the electrically conductive carbon-based material.

* * * * *